United States Patent [19]

Siskin et al.

[11] 3,728,411
[45] Apr. 17, 1973

[54] ACID CATALYZED CONVERSION OF AROMATICS TO ALKYL AROMATICS

[75] Inventors: Michael Siskin, Maplewood; Joseph J. Porcelli, Scotch Plains, both of N.J.

[73] Assignee: Esso Research and Engineering Company, Linden, N.J.

[22] Filed: Jan. 31, 1972

[21] Appl. No.: 222,275

Related U.S. Application Data

[63] Continuation-in-part of Ser. No. 96,263, Dec. 8, 1970, abandoned.

[52] U.S. Cl.........260/668 R, 260/279 R, 260/283 R, 260/329 F, 260/335, 260/671 M, 260/671 R
[51] Int. Cl..............................................C07c 15/02
[58] Field of Search...................260/668 A, 668 R, 260/671 M, 671 C

[56] References Cited

UNITED STATES PATENTS

| 3,031,514 | 4/1962 | Kosmin | 260/671 C |
| 3,708,553 | 1/1973 | Olah | 260/671 C |

*Primary Examiner*—Curtis R. Davis
*Attorney*—Leon Chasan et al.

[57] ABSTRACT

A process for making ethyl benzene and other valuable products by contacting either toluene or benzene with a catalyst system consisting essentially of niobium or tantalum pentafluoride dissolved in anhydrous liquid hydrogen fluoride.

11 Claims, No Drawings

ACID CATALYZED CONVERSION OF AROMATICS TO ALKYL AROMATICS

This application is a continuation-in-part of Ser. No. 96,263 filed Dec. 8, 1970, and now abandoned.

This invention relates to the alkylation of aromatics. In accordance with one aspect, this invention relates to the conversion of benzene to ethylbenzene. In accordance with another aspect, this invention relates to the conversion of toluene to ethylbenzene.

Ethylbenzene is of great commercial importance for the synthesis of styrene. Various prior art processes are known for the direct production of ethylbenzene from benzene.

For instance, the reaction of benzene at 200° with aluminum chloride was reported to give a certain proportion of ethylbenzene by Friedel and Crafts in 1883. [Friedel and Crafts *Bulletin Soc. Chim. France* 39, 195 (1883]. During the same year, these authors reported the same reaction with a five-fold excess of aluminum chloride in a closed vessel wherein biphenyl was formed as the primary product along with some ethylbenzene and toluene. [Friedel and Crafts, *Bulletin Soc. Chim. France* 39, 306 (1883)].

The conversion of benezene to toluene has been observed to occur over a nickel-silica catalyst at 372°. [V.N. Ipatieff and G. S. Monroe, *J. Am. Chem. Soc.*, 69, 710 (1947)].

Furthermore, it has been reported in the literature that benzene heated for 8 hours at 125°C. with aluminum chloride and hydrogen chloride in a sealed Pyrex tube was converted to toluene (0.5 percent) and ethylbenzene (1.6 percent). [A. V. Grosse, J. M. Mavity and V. N. Ipatieff, *J. Org. Chem.*, 3, 137 (1930)].

In another reaction carried out in a closed autoclave, in the absence of air and in the presence of dry hydrogen chloride and aluminum chloride, benzene reacted at 125°C. to produce ethylbenzene and biphenyl in small amounts. [V. N. Ipatieff and V. I. Komarewsky, *J. Am. Chem. Soc.*, 56, 1926 (1934)].

The formation of toluene and ethylbenzene was also observed wherein aluminum bromide was reacted with benzene. (E. Wertyporoch and H. Sagel, *Chem. Ber.*, 66, 1306 (1933)]. From the reaction of benzene at 350° and 900 psi over a nickel on kieselguhr catalyst toluene was produced as the major product in 9 percent yield. [B.A. Kazanskii, M.I. Rozengart and Z.F.Kuznetsova, *Dokl. Akad. Nauk. S.S.S.R.*, 126, 571 (1959)].

Under the aforesaid methods, the yields of ethyl benzene were too low to be of commercial significance.

Accordingly, an object of this invention is to improve the yields for the direct conversion of benzene to ethylbenzene.

Another object of this invention is to provide a process for converting toluene to ethylbenzene.

Other objects, aspects, as well as the several advantages of this invention will be apparent to those skilled in the art upon a further study of this specification and the appended claims.

According to the invention, we provide an improved process for the production of alkyl aromatic compounds which comprises contacting a suitable aromatic compound with a catalyst system formed by mixing either tantalum pentafluoride or niobium pentafluoride with anhydrous HF at a temperature in the range of 25°–500° C. to form an alkyl aromatic compound and then recovering said alkyl aromatic as a product of the process.

The aromatic reactant that can be employed, according to the invention can be $C_6$–$C_{30}$ aromatic and heterocyclic aromatic compounds such as benzofurans, quinolines and benzothiophenes.

Representative examples of suitable aromatic and heterocyclic aromatics that can be employed according to the subject invention include benzene, toluene, naphthalene, anthracene, pyrene, benzofuran, isobenzofuran, xanthene, quinoline, isoquinoline, acridine, benzothiophene. Benzene and toluene are the preferred reactants in the subject process.

The catalyst employed in the subject process is formed by mixing either niobium or tantalum pentafluoride with an anhydrous acid, said acid being capable of being a proton donor to the system and further being characterized by HX alone or combined with one of the following structures, either RX or $RQO_n$ wherein R can be hydrogen, $C_1$–$C_4$ alkyl, $C_3$–$C_{10}$ cycloalkyl, $C_6$–$C_{10}$ aryl, X can be one selected from the group chlorine, bromine, fluorine and iodine, Q can be either P or S and $n$ is an integer ranging from 2 to 4.

Suitable acids for use in this catalyst system are as follows: monofluoromethanesulfonic acid, difluoromethanesulfonic acid, trifluoromethanesulfonic acid, perfluorobutylsulfonic acid; trichloromethanesulfonic acid; fluorosulfonic acid; monofluorophosphoric acid; difluorophosphoric acid and dichlorophosphoric acid. The catalyst components are mixed together in a liquid diluent but can also be mixed in the absence of any diluent. The hereafter described inert organic diluent in which the reaction is carried out are suitable solvents from the catalyst components. The components can be mixed separately, i.e., preferred in the absence of the monomers or in situ in the presence of the monomers. In most cases, the order is not critical and allows for a variety of procedures to be used at the convenience of one skilled in the art.

Tantalum pentafluoride is a crystalline solid having a melting point of about 202° F. and a boiling point of about 446° F. The solid is appreciably soluble in substantially anhydrous liquid HF. Niobium pentafluoride is a crystalline solid having a melting point of about 161° F. and a boiling point of about 428° F. The solid is appreciably soluble in anhydrous liquid HF.

The amount of catalyst employed for carrying out the present invention can vary appreciably but will generally be in the range of 5 to 40 weight percent of the reaction mixture, preferably from about 10 to about 20 weight percent of the reaction mixture. The alkylation of the aromatic compound is ordinarily carried out at a temperature ranging from 25° to 500° C. Generally speaking it is desirable to operate at a temperature high enough to maintain the reactant and end products in at least a partial liquid phase. Preferably the temperature will range from 100° to 250° C.

The pressure at which the reaction is carried out will depend upon the aromatic being reacted, the reaction diluent, as well as other process variables. Generally speaking, this pressure is sufficient to maintain the reactants substantially in the liquid phase. In general, however, the pressure will range from 1 atmosphere to 600 atmospheres, or preferably from 1 atmosphere to 100 atmospheres. The reaction time will vary appreciably but will ordinarily range from about 1 second to 2 or 3 days, and preferably from 1 second to 24 hours.

The process of this invention can be carried out in the pressence of an inert diluent. Diluents suitable for use in the process are polyhalogenated solvents such as 1,1,2-trichlorotrifluoroethane, octafluorocyclobutane, sulfur dioxide, sulfurylchloridefluoride, sulfolane, trifluoromethane sulfonic acid, trifluoromethanesulfonic anhydride, etc.

The amount of diluent employed will vary appreciably and can range as high as 95 percent of the reaction mixture when desired.

The aromatic compound is contacted with the catalyst system under suitable reaction conditions as set forth above. The reaction of this invention can be carried out in a manner like that of the prior art and can be effected in a batch, intermittent or continuous manner. The catalyst can also be impregnated upon or encapsulated into a suitable support, incorporated into a fluidized bed, used as a molten salt process, sprayed as a liquid solution or can be suspended in the reaction mixture.

In a preferred embodiment, we also add from 1 to about 20 mole percent of hydrogen to the reaction mixture in order to improve the conversion of the aromatics to alkyl aromatics, especially in the processing of benzene to ethylbenzene.

Another modification of the invention involves the use of the aforesaid catalyst system in conjunction with a Group VIII or supported Group VIII metal hydrogenation catalyst either alone or in the presence of hydrogen. Examples of the Group VIII metal compounds commercially available from Engelhard; are platinum supported on carbon, platinum, nickel, palladium on carbon, etc. The preparation of such hydrogenation catalysts is described in a book entitled "Organic Chemistry, An Advanced Treatise", edited by H. Gilman and published by John Wiley and Sons, Inc., New York, N.Y., 1943, Vol I, pp 783–789.

A better understanding of our invention will be obtained upon reference to the following illustrative examples.

EXAMPLE 1

Into a 45 ml monel Parr high pressure micro reactor with a monel needle valve, toluene (17.4 g, 0.186 mole) which was dried by passing through a neutral alumina column and tantalum pentafluoride (2.77 g. 10 mmole) were placed under a nitrogen atmosphere. The reactor was closed and removed from the dry box, cooled in liquid nitrogen, evacuated and hydrogen fluoride ($\approx$1.5 g, 75 mmole) was added from a lecture bottle by direct connection. The reaction mixture was stirred for 16 hours at 150° after which it was allowed to cool to room temperature and the hydrogen fluoride was vented. The reaction mixture was filtered in the dry box and the filtrate was analyzed by gas chromatography using an Aerograph Model 1520 (80° C., 10 feet × ⅛ inch DC200 on Chromosorb P column). The products were collected on an Aerograph Autoprep A-700 (125° C., 30 feet × ¼ inch DC200 on Chromosorb W column) and identification was verified by infrared and nuclear magnetic resonance spectroscopy and by elemental analysis where possible. The results indicated the following products: 19.6 percent benzene (2.11 g, 27 mmole), 11.8 percent ethylbenzene (1.28 g, 12 mmole), 16.8 percent xylenes (1.81 g, 17 mmole) and 21.1 percent cumene (2.28 g, 19 mmole) based upon toluene converted.

EXAMPLE 2

The procedure of Example 1 was repeated at 200° in a Parr Model 4521 stirred 1 liter Hastelloy C reactor with a 10-fold increase in the amounts of reactant and catalyst plus hydrogen (0.6 g, 0.3 mole). Product analysis indicated the following: 14.4 percent benzene (18.8 g, 0.24 mole), 13.1 percent ethylbenzene (17.0 g, 0.16 mole), 18.8 percent xylenes (24.4 g, 0.23 mole) and 16.7 percent cumene (21.6 g, 0.18 mole) as above.

EXAMPLE 3

The procedure of Example 1 was repeated at 200° C. using niobium pentafluoride (1.88 g, 10.0 mmole) (instead of the tantalum compound. Product analysis indicated the following: 15.7 percent benzene (1.8 g, 23 mmole), 13 percent ethylbenzene (1.49 g, 14.0 mmole), 16.8 percent xylenes (1.94 g, 21.0 mmole) and 16.7 percent cumene (1.9 g, 16 mmole).

EXAMPLE 4

The procedure of Example 1 was followed at 200° C. using benzene (17.6 g, 22.5 mmole), dried by refluxing over and distillation from phosphorus pentoxide, tantalum pentafluoride (2.77 g, 10.0 mmole) and hydrogen fluoride ($\approx$2 g, 0.1 mole) to yield 30 percent toluene (2.30 g, 25.0 mmole) and 39 percent ethylbenzene (2.97 g, 28.0 mmole).

EXAMPLE 5

The procedure of Example 4 was repeated at 100° C. to give 1.2 percent toluene (0.18 g, 2.0 mmole) and 2.1 percent ethylbenzene (0.32 g, 30 mmole).

EXAMPLE 6

The procedure of Example 4 was followed with 5 percent platinum on carbon (0.27 g) to yield 35.5 percent toluene (2.89 g, 31 mmole) and 40.1 percent ethylbenzene (3.29 g, 31 mmole).

What is claimed is:

1. A process for alkylating aromatics, said process comprising the step of contacting an aromatic compound with a catalyst system formed by mixing either tantalum or niobium pentafluoride with an anhydrous acid, said acid being capable of being a proton donor to the system and further characterized by one of the following structures, HX alone or combined with either RX or RQO$_n$ wherein R can be hydrogen, $C_1$–$C_4$ alkyl, $C_3$–$C_{10}$ cycloalkyl, $C_6$–$C_{10}$ aryl, X can be one selected from the group consisting of chlorine, bromine, fluorine and iodine, Q can be either P or S and $n$ is an integer ranging from 2 to 4.

2. A process according to claim 1 wherein the aromatic compound is one selected from the group consisting of $C_6$–$C_{30}$ aromatic and heterocyclic aromatic compounds.

3. A process according to claim 2 wherein said aromatic compound is one selected from the group consisting of benzene, naphthalene, anthracene, toluene, pyrene, benzofuran, isobenzofuran, xanthene, quinoline, isoquinoline, acridine and benzothiophene.

4. A process according to claim 1 wherein said aromatic compound is benzene.

5. A process according to claim 1 wherein said aromatic compound is toluene.

6. A process according to claim 1 wherein said reaction is carried out in the presence of an inert solvent.

7. A process according to claim 6 wherein said solvent is a polyhalogenated hydrocarbon.

8. A process according to claim 1 wherein said reaction is carried out in the presence of hydrogen.

9. A process according to claim 8 wherein said reaction is carried out in the presence of a hydrogenation catalyst.

10. A process according to claim 1 wherein said temperature ranges from 25° to 500° C. and said pressure ranges from atmospheric to 600 atmospheres.

11. A process according to claim 9 wherein said hydrogenation catalyst is platinum deposited upon carbon in which the amount of platinum is 5 percent by weight based on the weight of the catalyst.

* * * * *